United States Patent
Tzikas et al.

(10) Patent No.: US 6,504,016 B2
(45) Date of Patent: Jan. 7, 2003

(54) REACTIVE DYES, PROCESSES FOR THE PREPARATION THEREOF AND THE USE THEREOF

(75) Inventors: Athanassios Tzikas, Pratteln (CH); Bruno Cortese, Brunstatt (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/061,125

(22) Filed: Nov. 13, 2001

(65) Prior Publication Data

US 2002/0069469 A1 Jun. 13, 2002

(30) Foreign Application Priority Data

Nov. 15, 2000 (EP) .............................. 00811078

(51) Int. Cl.[7] ..................... C09B 62/513; C09B 62/475; D06P 1/384
(52) U.S. Cl. ............................ 534/637; 534/598; 8/549
(58) Field of Search ................ 534/637, 598; 8/549

(56) References Cited

U.S. PATENT DOCUMENTS 4,786,721 A    11/1988    Tzikas et al. ............... 534/617
6,025,478 A    2/2000    Kunde et al. ............... 534/618

FOREIGN PATENT DOCUMENTS

EP    0231836    8/1987
EP    0499588    8/1992

OTHER PUBLICATIONS

Derwent Abstr. 87–222244/32 for EP 0231836 (1987).
Derwent Abstr. 92–278280/34 for EP 0499588 (1992).
Derwent Abstr. 89–124333/17 for EP 0313513 (1989).

*Primary Examiner*—Fiona T. Powers
(74) *Attorney, Agent, or Firm*—Kevin T. Mansfield

(57) ABSTRACT

Reactive dyes of the formula (1)

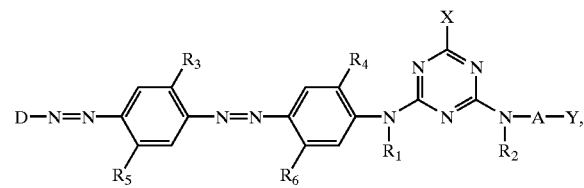

(1)

wherein the variables are as defined in the specification are especially suitable for dyeing cotton and yield dyeings having good all-round fastness properties.

10 Claims, No Drawings

REACTIVE DYES, PROCESSES FOR THE PREPARATION THEREOF AND THE USE THEREOF

The present invention relates to novel reactive dyes, to processes for the preparation thereof and to the use thereof in dyeing or printing textile fibre materials.

The practice of dyeing using reactive dyes has recently led to higher demands being made in terms of the quality of the dyeings and the profitability of the dyeing process. As a result, there is still a need for novel reactive dyes having improved properties, especially in respect of their application.

Dyeing nowadays requires reactive dyes that have sufficient substantivity and at the same time have good ease of washing off of unfixed dye. They should also have a good tinctorial yield and high reactivity, the objective being to provide especially dyeings having high degrees of fixing. The known dyes do not satisfy these requirements in all properties.

The problem underlying the present invention is accordingly to find, for the dyeing and printing of fibre materials, novel improved reactive dyes that possess the qualities characterised above to a high degree. The novel dyes should especially be distinguished by high fixing yields and high fibre-dye bond stability; it should also be possible for dye that is not fixed to the fibre to be washed off easily. The dyes should also yield dyeings having good all-round fastness properties, for example light-fastness and wet-fastness properties.

It has been shown that the problem posed is largely solved by the novel dyes defined below.

The present invention accordingly relates to reactive dyes of formula (1)

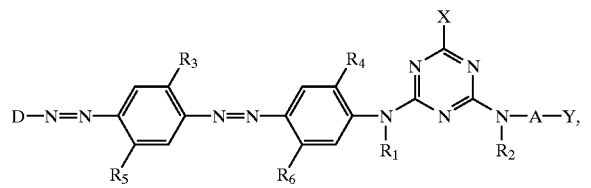

(1)

wherein
$R_1$ and $R_2$ are each independently of the other hydrogen or unsubstituted or substituted $C_1$–$C_4$alkyl,
$R_3$ and $R_4$ are each independently of the other hydrogen, $C_1$–$C_4$alkyl, $C_1$–$C_4$alkoxy, halogen, carboxy or sulfo,
$R_5$ and $R_6$ are each independently of the other hydrogen, $C_1$–$C_4$alkyl, $C_1$–$C_4$alkoxy, halogen, nitro, $C_2$–$C_4$alkanoylamino, benzoylamino, ureido, carboxy or sulfo,
D is a radical of formula

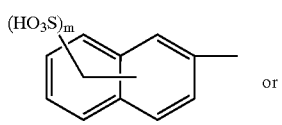

(2)

or

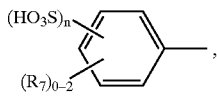

(3)

wherein
$(R_7)_{0-2}$ denotes from 0 to 2 identical or different substituents selected from the group halogen, $C_2$–$C_4$alkanoylamino, $C_1$–$C_4$alkyl and $C_1$–$C_4$alkoxy,
X is halogen,
A—Y is a radical of formula —(CH$_2$)$_2$—O—(CH$_2$)$_2$—SO$_2$—Z$_1$, (4a)

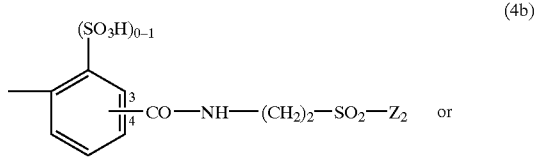

(4b)

or

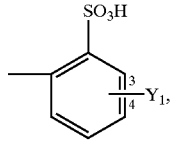

(4c)

wherein
$Y_1$ is α,β-dibromopropionylamino or α-bromoacryloylamino and
$Z_1$ and $Z_2$ are each independently of the other vinyl, β-chloroethyl or β-sulfatoethyl,
m is the number 1, 2 or 3, and
n is the number 1 or 2, with the proviso that
D is a radical of formula (3) when A—Y is a radical of formula (4b).

As $C_1$–$C_4$alkyl for $R_1$, $R_2$, $R_3$, $R_4$, $R_5$, $R_6$ and $R_7$, each independently of the others, there come into consideration, for example, methyl, ethyl, n-propyl, isopropyl, n-butyl, sec-butyl, tert-butyl and isobutyl, preferably methyl or ethyl, and especially methyl. The alkyl radicals $R_1$ and $R_2$ mentioned may be unsubstituted or substituted, for example, by hydroxy, sulfo, sulfato, cyano or by carboxyl. Preference is given to the corresponding unsubstituted alkyl radicals.

As $C_1$–$C_4$alkoxy for $R_3$, $R_4$, $R_5$, $R_6$ and $R_7$, each independently of the others, there come into consideration, for example, methoxy, ethoxy, n-propoxy, isopropoxy, n-butoxy, sec-butoxy, tert-butoxy and isobutoxy, preferably methoxy or ethoxy, and especially methoxy.

As halogen for $R_3$, $R_4$, $R_5$, $R_6$ and $R_7$, each independently of the others, there come into consideration, for example, fluorine, chlorine and bromine, preferably chlorine or bromine, and especially chlorine.

As $C_2$–$C_4$alkanoylamino for $R_5$, $R_6$ and $R_7$, each independently of the others, there come into consideration, for example, acetylamino and propionylamino, especially acetylamino.

As a radical of formula (2), D in the reactive dyes of formula (1) according to the invention is, for example, a radical of formula

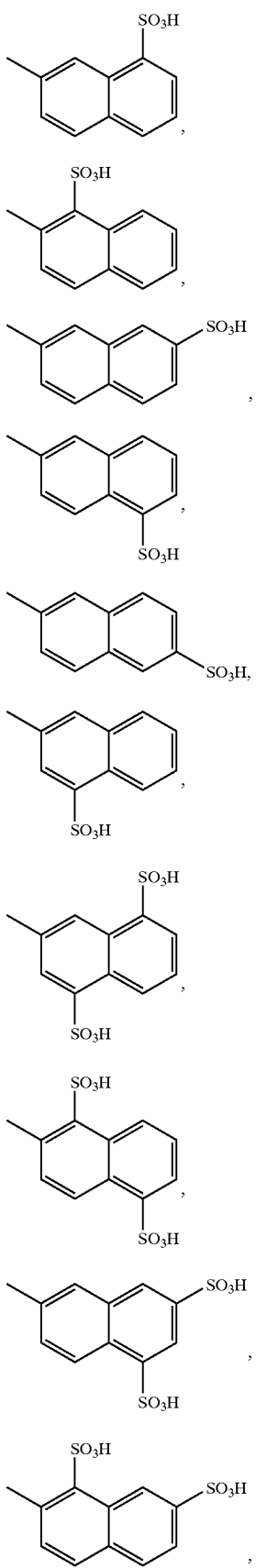
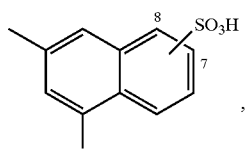
preferably of formula (2.14), (2.15) or (2.16), and especially of formula (2.14).
As a radical of formula (3), D in the reactive dyes of formula (1) according to the invention is, for example, a radical of formula

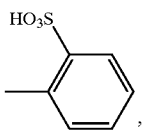
(3.3)

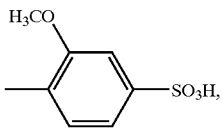
(3.4)

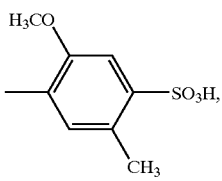
(3.5)

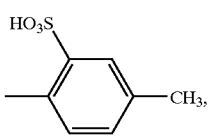
(3.6)

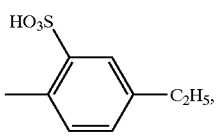
(3.7)

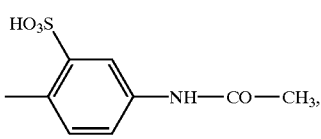
(3.8)

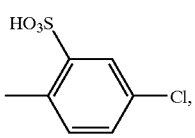
(3.9)

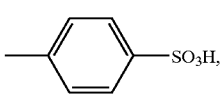
(3.10)

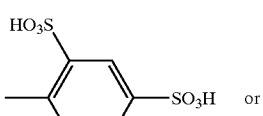 or
(3.11)

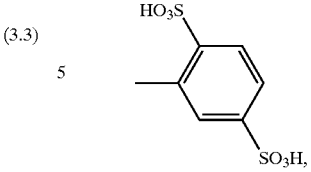
(3.12)

preferably of formula (3.11) or (3.12), and especially of formula (3.12).

For X there come into consideration, for example, fluorine, chlorine and bromine. $R_1$ and $R_2$ are preferably, each independently of the other, hydrogen or $C_1$–$C_4$alkyl, especially hydrogen or methyl, and more especially hydrogen.

$R_3$ and $R_4$ are preferably, each independently of the other, hydrogen, $C_1$–$C_4$alkyl, $C_1$–$C_4$-alkoxy or sulfo, especially hydrogen, $C_1$–$C_4$alkyl or $C_1$–$C_4$alkoxy, and more especially hydrogen.

$R_5$ and $R_6$ are preferably, each independently of the other, hydrogen, $C_1$–$C_4$alkyl, $C_1$–$C_4$-alkoxy, $C_2$–$C_4$alkanoylamino, benzoylamino, ureido or sulfo, especially hydrogen, $C_1$–$C_4$alkyl, $C_1$–$C_4$alkoxy, ureido, $C_2$–$C_4$alkanoylamino, and more especially hydrogen.

$R_7$ in radical D of formula (3) preferably denotes from 0 to 2 identical or different substituents selected from the group $C_1$–$C_4$alkyl and $C_1$–$C_4$alkoxy and is especially hydrogen.

X is preferably fluorine or chlorine, especially fluorine.

m in radical D of formula (2) is preferably the number 2 or 3 and especially the number 3.

n in radical D of formula (3) is preferably the number 2.

Preference is given to the reactive dyes according to the invention wherein m is the number 2 or 3, n is the number 2, and $R_7$ is hydrogen.

$Z_1$ and $Z_2$ are preferably, each independently of the other, vinyl or β-chloroethyl. In the radicals of formula (4b), the fibre-reactive group —CO—NH—$(CH_2)_2$—$SO_2$—$Z_2$ is preferably in the 3-position. Preferably, the radical of formula (4b) does not contain a sulfo group on the benzene ring.

In an especially preferred embodiment of the reactive dyes of formula (1) according to the invention, the radical of formula —A—Y is a radical of formula (4a) or (4b), especially of formula (4a).

In a preferred embodiment of the present invention, the reactive dye of formula (1) is a reactive dye of formula

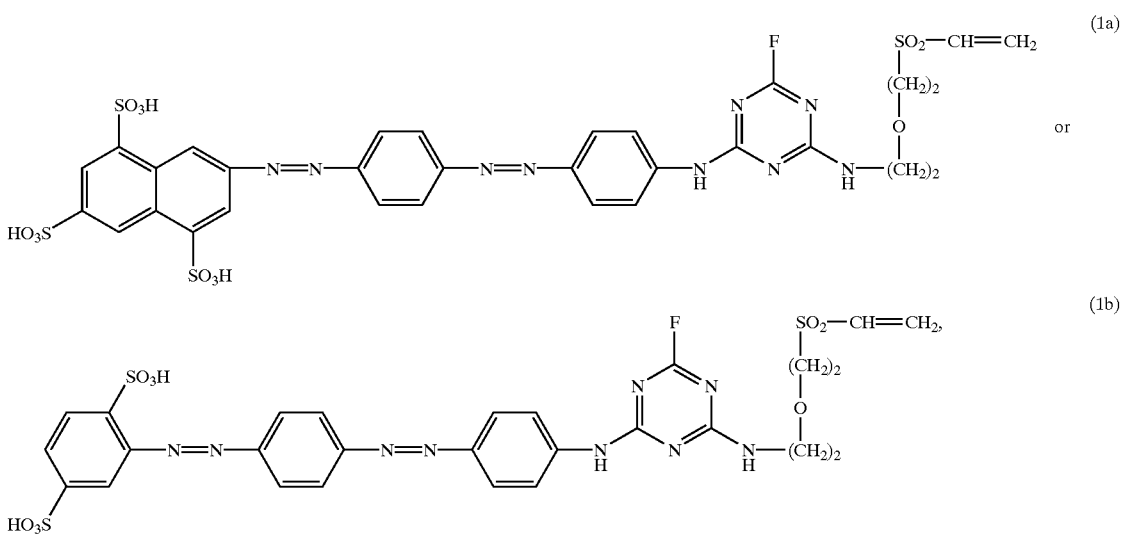

especially of formula (1a).

The present invention relates also to a process for the preparation of the reactive dyes according to the invention, wherein a compound of formula

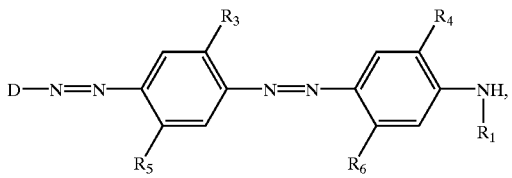

(5)

cyanuric halide and an amine of formula

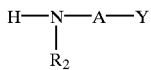

(6)

are reacted with one another in any order, the definitions and preferred meanings given above applying for $R_1$, $R_2$, $R_3$, $R_4$, $R_5$, R6, A—Y and D.

Because the process steps mentioned above may be carried out in different orders as well as, where appropriate, simultaneously, different process variants are possible. The reaction is generally carried out stepwise, the order of the simple reactions between the individual reaction components advantageously being determined by the particular conditions. For example, approximately 1 molar equivalent of an amine of formula (6) is reacted with approximately 1 molar equivalent of cyanuric halide and the product obtained is then condensed with approximately 1 molar equivalent of a compound of formula (5). In another process variant, for example, approximately 1 molar equivalent of a compound of formula (5) is reacted with approximately 1 molar equivalent of cyanuric halide and the condensation product obtained is then condensed with approximately 1 molar equivalent of an amine of formula (6). Instead of the dye of formula (5), it is also possible to use its precursor and to complete its preparation in the course of the subsequent process by diazotisation followed by a coupling reaction.

The individual condensation reactions are carded out, for example, according to methods known per se, generally in aqueous solution, at a temperature of, for example, from 0 to 50° C., especially from 0 to 10° C., and at a pH of, for example, from 3 to 10, especially from 3 to 7.

As cyanuric halide there are suitable, for example, cyanuric chloride and cyanuric fluoride, especially cyanuric fluoride.

The end product may optionally be subjected to a further transformation reaction. Such a transformation reaction is, for example, conversion of a reactive group, present in Y, that is to say in $Z_1$, $Z_2$ or $Y_1$, and capable of conversion into a vinyl group, into its vinyl form by treatment with dilute sodium hydroxide solution, e.g. conversion of the β-sulfatoethylsulfonyl or β-chloroethylsulfonyl group into the vinylsulfonyl radical. Such reactions are known per se. Preferably, vinylation is carried out.

The preparation process for the reactive dyes according to the invention is preferably carried out by reacting approximately 1 molar equivalent of a compound of formula (5), wherein the definitions and preferred meanings given above apply for $R_1$, $R_3$, $R_4$, $R_5$, $R_6$ and D, with approximately 1 molar equivalent of cyanuric chloride or cyanuric fluoride, preferably cyanuric fluoride, and condensing the resulting condensation product with approximately 1 molar equivalent of a compound of formula (6), wherein the definitions and preferred meanings given above apply for $R_2$ and A, and wherein Y contains a reactive group capable of conversion into a vinyl group, and converting the said reactive group into its vinyl form.

The compounds of formulae (5) and (6) are known or can be prepared analogously to known compounds.

The reactive dyes of formula (1) according to the invention are present either in the form of their free acid or, preferably, in the form of their salts. Suitable salts are, for example, alkali metal, alkaline earth metal or ammonium salts or salts of an organic amine. Examples that may be mentioned are sodium, lithium, potassium or ammonium salts or a mono-, di- or tri-ethanolamine.salt.

The compounds of formula (1) according to the invention are suitable as dyes for dyeing and printing a wide variety of materials, such as hydroxyl-group-containing or nitrogen-containing fibre materials. There may be mentioned, as examples of nitrogen-containing fibre materials, silk, leather, wool, polyamide fibres and polyurethanes. The reactive dyes according to the invention are especially suitable for dyeing and printing all types of cellulosic fibre materials. Such cellulosic fibre materials are, for example, natural cellulose fibres, such as cotton, linen and hemp, and cellulose and regenerated cellulose, preferably cotton. The reactive dyes according to the invention are also suitable for dyeing or printing cellulosic blend fabrics, for example blends of cotton and polyamide fibres or especially cotton/polyester blend fibres.

The reactive dyes according to the invention can be applied to the fibre material and fixed to the fibre in a number of ways, especially in the form of aqueous dye solutions or dye print pastes. They are suitable for the exhaust process and also for dyeing using the pad-dyeing process, according to which the goods are impregnated with aqueous, optionally salt-containing, dye solutions and the dyes are fixed, after treatment with an alkali or in the presence of an alkali, optionally under the action of heat or as a result of being kept at room temperature for several hours. After fixing, the dyeings or prints are thoroughly rinsed with cold and hot water, optionally with addition of an agent that has a dispersing action and promotes diffusion of unfixed dye.

The reactive dyes according to the invention are distinguished by high reactivity, good fixing characteristics and very good build-up characteristics. They can therefore be used in the exhaust dyeing process at low dyeing temperatures and require only short steaming times in the pad-steam process. The degrees of fixing are high and unfixed dye can be washed off readily, the difference between the degree of exhaust and the degree of fixing being remarkably small, that is to say the soaping loss is very small. The dyes according to the invention are also especially suitable for printing, especially on cotton, but also for printing nitrogen-containing fibres, for example wool or silk or blend fabrics containing wool or silk.

The dyeings and prints produced using the reactive dyes according to the invention have a high tinctorial strength and a high fibre-dye bond stability in both acidic and alkaline ranges, and they also have good light-fastness and very good wet-fastness properties, such as fastness to washing, to water, to seawater, to crossdyeing and to perspiration, as well as good fastness to chlorine, to pleating, to hot pressing and to rubbing.

The following Examples serve to illustrate the invention. The temperatures are given in degrees Celsius, parts are parts by weight, and the percentages relate to percent by weight, unless otherwise indicated. Parts by weight relate to parts by volume in a ratio of kilograms to liters.

EXAMPLE 1 a) 18.5 parts of cyanuric fluoride are vigorously stirred at a temperature of 0° C. in 100 parts of an ice/water mixture with addition of a wetting agent and 0.16 part of disodium hydrogen phosphate. A neutral solution of 80.10 parts of a dye of formula

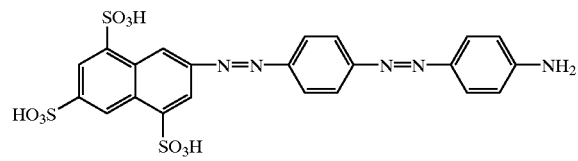

in 580 parts of water is added thereto dropwise. The temperature of the reaction mixture is maintained at from 0 to 5° C. and the pH is maintained at 7 by addition of sodium hydroxide solution, until the condensation is complete.

b) At 4° C. and pH 7, first 22.63 parts of a compound of formula

are added to the reaction mixture obtained according to a) and then, at a temperature of from 4 to 6° C., adjustment to a pH of 7.5 is carried out by addition of 20% soda solution. Condensation is carried out for a further 4 hours at from 24 to 34° C and at pH 7.5. The pH is then adjusted to 6 using dilute hydrochloric acid and stirring is carried out overnight at room temperature.

c) The reaction mixture obtained according to b) is adjusted to pH 11 by addition of sodium hydroxide solution and is stirred for 35 minutes at that pH and at room temperature. The pH is then adjusted to 6 using dilute hydrochloric acid; the reaction mixture obtained is clarified by filtration and concentrated by evaporation in vacuo at slightly elevated temperature. 158.2 parts of a mixture are obtained that comprises a compound that in the form of the free acid corresponds to formula (101)

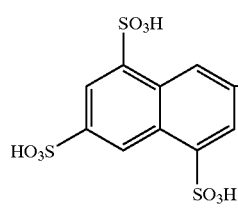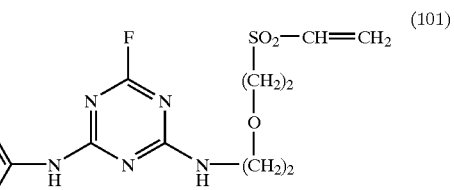

and dyes cotton a yellow shade with good all-round fastness properties.

EXAMPLES 2 to 10

The dyes set out below, which dye cotton yellow shades with good all-round fastness properties, can be obtained analogously to the procedure given in Example 1.

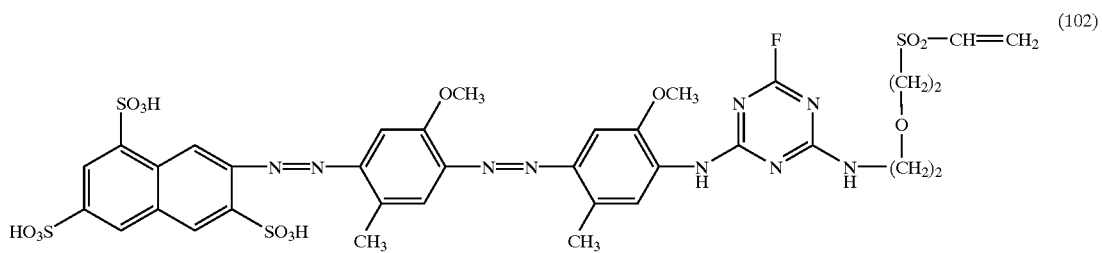
(102)
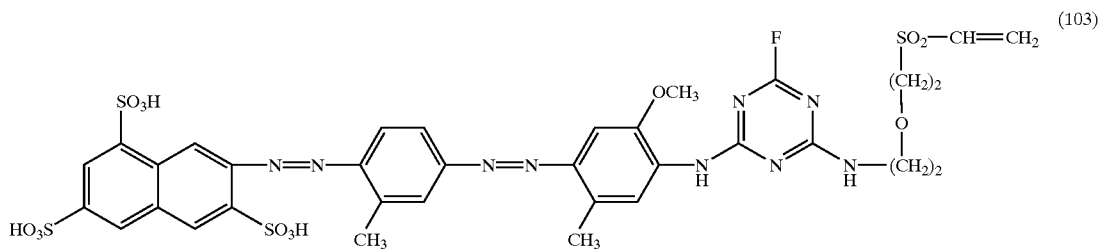
(103)
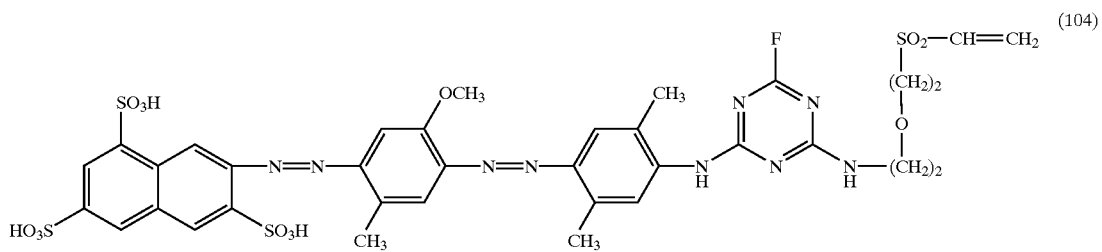
(104)
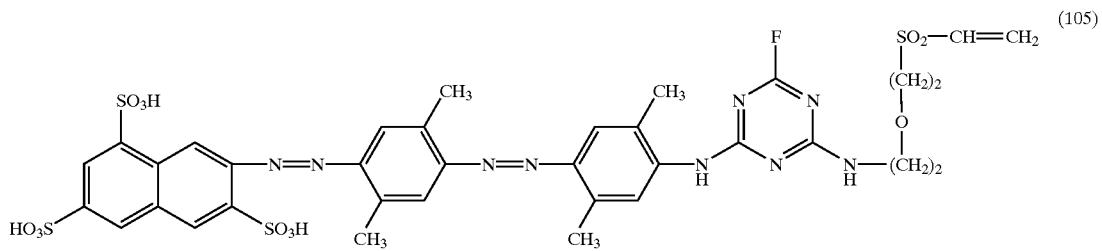
(105)
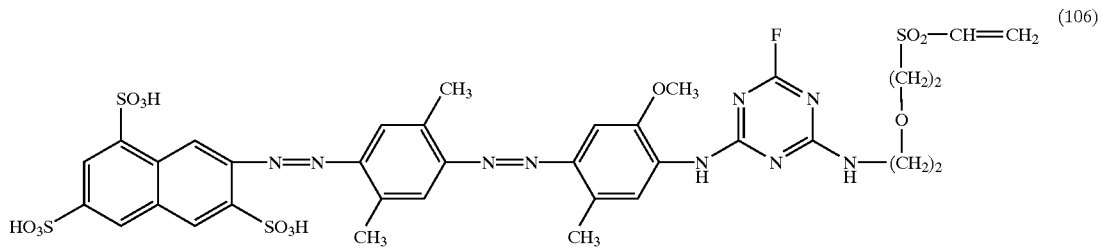
(106)
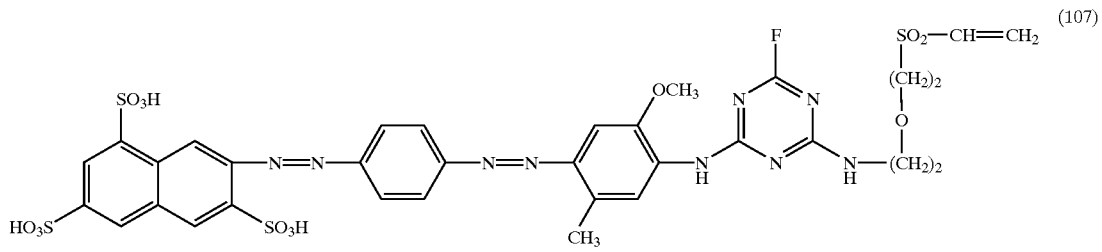
(107)

-continued

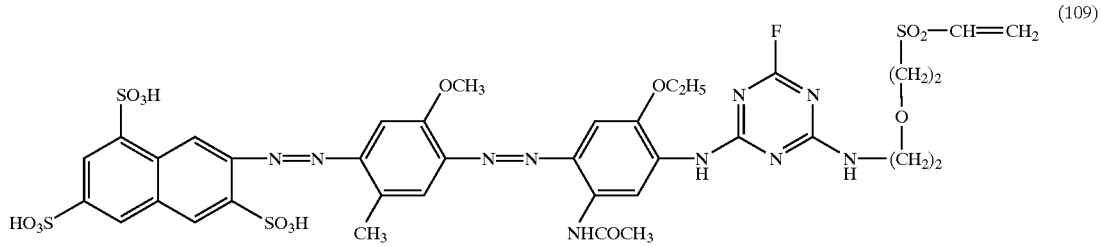
(108)

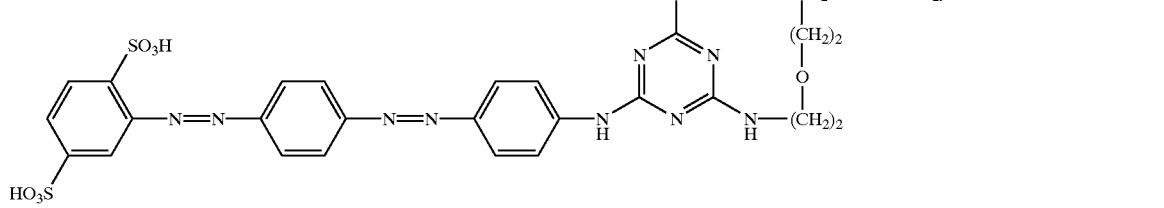
(109)

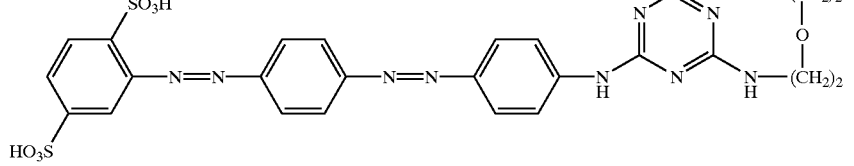
(110)

Dyeing Procedure I 100 parts of cotton fabric are placed, at 80° C., in 1500 parts of a dye bath containing 45 g of sodium chloride per litre and 2 parts of the reactive dye obtained according to Example 1. After 45 minutes at 80° C., 20 g of calcined soda per liter are added. Dyeing is carried out for a further 45 minutes at that temperature. The dyed goods are then rinsed, soaped at the boil for a quarter of an hour with a non-ionic detergent, rinsed again and dried.

As an alternative to the procedure given, dyeing may also be carried out at 60° C. rather than 80° C.

Dyeing Procedure II 0.1part of the dye according to Example 1 is dissolved in 200 parts of water, and 0.5 part of sodium sulfate, 0.1 part of a levelling aid (based on the condensation product of a higher aliphatic amine and ethylene oxide) and 0.5 part of sodium acetate are added. The pH is then adjusted to 5.5 using acetic acid (80%). The dye bath is heated at 50° C. for 10 minutes and then 10 parts of a woollen fabric are added. The bath is heated to a temperature of 100° C. over a period of about 50 minutes and dyeing is carried out for 60 minutes at that temperature. Cooling to 90° C. is then carried out and the dyed goods are removed. The woollen fabric is washed with hot and cold water and is then spun and dried.

Printing Procedure

While stirring rapidly, 3 parts of the dye obtained according to Example 1 are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed fabric is steamed in saturated steam at 102° C. for 2 minutes. The printed fabric is then rinsed, optionally soaped at the boil, rinsed again, and then dried.

What is claimed is:

1. A reactive dye of formula (1)

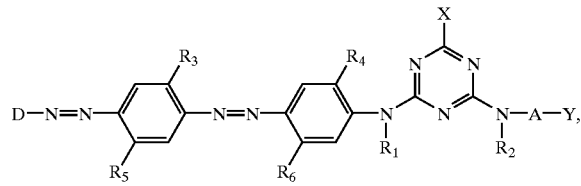
(1)

wherein $R_1$ and $R_2$ are each independently of the other hydrogen or unsubstituted or substituted $C_1$–$C_4$alkyl, $R_3$ and $R_4$ are each independently of the other hydrogen, $C_1$–$C_4$alkyl, $C_1$–$C_4$alkoxy, halogen, carboxy or sulfo, $R_5$ and $R_6$ are each independently of the other hydrogen, $C_1$–$C_4$alkyl, $C_1$–$C_4$alkoxy, halogen, nitro, $C_2$–$C_4$alkanoylamino, benzoylamino, ureido, carboxy or sulfo, D is a radical of formula

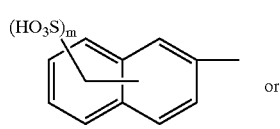
(2)

or

-continued $$(HO_3S)_n\text{—Ar—}(R_7)_{0-2} \quad (3)$$

wherein
 $(R_7)_{0-2}$ denotes from 0 to 2 identical or different substituents selected from the group halogen, $C_2$–$C_4$alkanoylamino, $C_1$–$C_4$alkyl and $C_1$–$C_4$alkoxy,
 X is halogen, A—Y is a radical of formula $$-(CH_2)_2-O-(CH_2)_2-SO_2-Z_1 \quad (4a),$$

$$(SO_3H)_{0-1}\text{—Ar—}CO-NH-(CH_2)_2-SO_2-Z_2 \text{ or} \quad (4b)$$

$$SO_3H\text{—Ar—}Y_1, \quad (4c)$$

wherein
 $Y_1$ is α,β-dibromopropionylamino or α-bromoacryloylamino and
 $Z_1$ and $Z_2$ are each independently of the other vinyl, β-chloroethyl or β-sulfatoethyl,
 m is the number 1, 2 or 3, and
 n is the number 1 or 2, with the proviso that
D is a radical of formula (3) when A—Y is a radical of formula (4b).

2. A reactive dye according to claim 1, wherein $R_1$ and $R_2$ are hydrogen.

3. A reactive dye according to claim 1, wherein $R_3$ and $R_4$ are hydrogen.

4. A reactive dye according to claim 1, wherein $R_5$ and $R_6$ are hydrogen.

5. A reactive dye according to claim 1, wherein X is fluorine or chlorine.

6. A reactive dye according to claim 1, wherein
 m is the number 2 or 3,
 n is the number 2 and
 $R_7$ is hydrogen.

7. A reactive dye according to claim 1 that corresponds to formula (1a)

(1b)

8. A process for the preparation of a reactive dye according to claim 1, which process comprises reacting a compound of formula (5)

cyanuric halide and an amine of formula (6)

with one another in any order,
 $R_1$, $R_2$, $R_3$, $R_4$, $R_5$, R6, A—Y and D being as defined in claim 1.

9. A process for dyeing or printing hydroxyl-group-containing or nitrogen-containing fibre materials, which comprises applying to said fibre materials a reactive dye according to claim 1.

10. A process according to claim 9, wherein said fibre material is cellulosic fibre material.

* * * * *